United States Patent
Auchter-Bruening

(10) Patent No.: US 8,182,025 B2
(45) Date of Patent: May 22, 2012

(54) METHOD OF PRODUCING A PANEL ASSEMBLY

(75) Inventor: Michael Joseph Auchter-Bruening, Huntington Woods, MI (US)

(73) Assignee: Inalfa Roof Systems Group B.V., Venray (NL)

( * ) Notice: Subject to any disclaimer, the term of this patent is extended or adjusted under 35 U.S.C. 154(b) by 374 days.

(21) Appl. No.: 12/431,918

(22) Filed: Apr. 29, 2009

(65) Prior Publication Data

US 2010/0276969 A1    Nov. 4, 2010

(51) Int. Cl.
B60R 13/04    (2006.01)

(52) U.S. Cl. .................................................. 296/191

(58) Field of Classification Search .............. 296/191, 296/146.6, 146.5, 146.15, 187.02, 187.12
See application file for complete search history.

(56) References Cited

U.S. PATENT DOCUMENTS

| | | | | |
|---|---|---|---|---|
| 4,378,394 A * | 3/1983 | Miura et al. | ................. | 428/113 |
| 4,378,395 A * | 3/1983 | Asoshina et al. | ............. | 428/158 |
| 4,451,518 A * | 5/1984 | Miura et al. | ................. | 428/137 |
| 4,738,482 A * | 4/1988 | Bohm et al. | ............. | 296/216.09 |
| 4,822,098 A * | 4/1989 | Vogt et al. | ................. | 296/146.5 |
| 4,826,239 A | 5/1989 | Nishikawa | | |
| 4,830,908 A * | 5/1989 | Nakajima et al. | ............. | 442/222 |
| 4,881,773 A * | 11/1989 | Ichinose | .................. | 296/216.09 |
| 4,936,064 A * | 6/1990 | Gibb | ................. | 52/232 |
| 4,945,682 A * | 8/1990 | Altman et al. | ................. | 49/502 |
| 5,024,399 A * | 6/1991 | Barquet et al. | ................. | 244/119 |
| 5,050,928 A * | 9/1991 | Bohm et al. | ............. | 296/216.09 |
| 5,069,737 A * | 12/1991 | Guiton | .................. | 156/210 |
| 5,170,587 A * | 12/1992 | Nakatani et al. | ............. | 49/490.1 |
| 5,195,440 A * | 3/1993 | Gottlieb | ................. | 108/51.3 |
| 5,501,052 A * | 3/1996 | Saji | ................. | 52/716.5 |
| 5,682,667 A * | 11/1997 | Flagg | .................. | 29/460 |
| 5,727,840 A * | 3/1998 | Ochiai et al. | ................. | 49/501 |
| 5,779,301 A * | 7/1998 | Ito | .................. | 49/466 |
| 5,865,496 A * | 2/1999 | Odan et al. | ................. | 296/146.6 |
| 6,079,771 A * | 6/2000 | Brandner et al. | ........ | 296/216.09 |
| 6,273,500 B1 * | 8/2001 | Boersma et al. | ......... | 296/216.09 |
| 6,283,542 B1 * | 9/2001 | P.ang.tz | ................. | 296/211 |
| 6,328,359 B1 * | 12/2001 | Pacella et al. | ................. | 293/128 |
| 6,540,289 B2 * | 4/2003 | Bergmiller et al. | ...... | 296/216.09 |
| 6,669,278 B2 * | 12/2003 | Patelczyk et al. | ........ | 296/220.01 |
| 6,893,084 B2 * | 5/2005 | Tamura et al. | ............. | 296/216.09 |
| 7,628,448 B2 * | 12/2009 | Katayama et al. | ............ | 296/213 |
| 7,658,441 B2 * | 2/2010 | Rich et al. | ................. | 296/216.09 |
| 7,744,146 B2 * | 6/2010 | Lee | .................. | 296/146.6 |

* cited by examiner

*Primary Examiner* — Kiran B Patel
(74) *Attorney, Agent, or Firm* — Steven M. Koehler; Westman, Champlin & Kelly, P.A.

(57) ABSTRACT

A method of constructing a reinforced closure panel assembly for a vehicle roof assembly includes providing a substantially planar panel having two opposite surfaces, providing a reinforcement having a circumferential flange fitting on one of the surfaces of the panel, providing adhering material, positioning the reinforcement on said surface of the panel with interposition of the adhering material at least temporarily adhering the reinforcement to the panel such that an enclosed space is formed between the reinforcement and the panel, sealed by the adhering material, and injecting fluid encapsulating material into the space so as to substantially completely fill the space, allowing it to solidify and forming adherence of the reinforcement to the panel.

10 Claims, 6 Drawing Sheets

METHOD OF PRODUCING A PANEL ASSEMBLY

BACKGROUND

The discussion below is merely provided for general background information and is not intended to be used as an aid in determining the scope of the claimed subject matter.

In the prior art, reinforcements and/or brackets are fastened to panels, in particular glass panels, to increase their stiffness. This is done by means of either a PU (polyurethane) gluing process, or an encapsulating process using PU low pressure injection molding.

In the gluing process, the surfaces to be connected are prepared and are provided with glue which should be cured for a long time, several hours, after the surfaces have been put together. The curing process should take place under the influence of the humidity in the air in a conditioned environment. No mechanical load can be exerted on the glued parts during the securing process.

In the encapsulating process, the parts to be connected are inserted into a tool/mold, after which the PU encapsulation is provided in a low pressure injection molding process. The reinforcements and/or brackets are surrounded at least partly by the PU material. After a short time lapse, a few minutes depending on the amount of encapsulating material and glass area, the assembly can be removed from the tool, and the product should be finished in order to remove films and injection residues along the edges of the encapsulation. The product is then immediately ready to be loaded.

An important characteristic of a (glass) panel assembly in a vehicle roof construction is the stiffness of the panel. Stiffness is required to prevent an excessive bending of the panel in conditions in which the dynamic pressure on the outside of the panel is much lower than on the inside. Such a pressure difference, which may be present at high vehicle speeds, can lead to seal malfunction at the edges of the panel, and therefore a noise problem, if the panel is not sufficiently rigid.

The stiffness of a panel in which the reinforcement is glued to the panel is less than that of encapsulated reinforcement, assuming that the reinforcements are equally rigid. In order to create a sufficient rigidity in glued reinforcements, the reinforcements and/or brackets should be made even more rigid, which means more height, which is unfavorable as it leads to head room loss for the vehicle passengers.

A disadvantage of the encapsulation process is that the material is relatively expensive and also the encapsulating tools require higher investments.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An aspect of the invention provides a method for making a reinforced panel assembly, comprising:
  providing a substantially planar panel having two opposite surfaces,
  providing a reinforcement having a circumferential flange fitting on one of the surfaces of the panel,
  providing adhering material,
  positioning the reinforcement on said surface of the panel with interposition of the adhering material at least temporarily adhering the reinforcement to the panel such that an enclosed space is formed between the reinforcement and the panel, sealed by the adhering material,
  injecting fluid encapsulating material into the space so as to substantially completely fill the space, allowing it to solidify and forming adherence, and in one embodiment the main adherence, of the reinforcement to the panel.

Due to this method it is possible to use very fluid encapsulating material, without requiring an external tool or mold, as the panel and reinforcement function as the mold. Because the encapsulating material is only provided internally, no extensive finishing is necessary. As use is made of encapsulating material, short curing times are available so that panel assemblies can be loaded quickly and the manufacturing process can be continued without a long waiting time. No conditioned storage space for the panel assemblies is necessary. Generally, the encapsulating material will provide the main adherence of the reinforcement to the panel, that is it will be the primary method of adherence when compared separately to each of other methods of adherence used to secure the reinforcement to the panel.

An embodiment of the method includes providing two holes in the reinforcement, and injecting the fluid encapsulating material into the space through one hole and allowing air to escape from the space through the other hole. In this method, it is possible to close off the injection hole completely by the injection tool so that it is easy to inject the encapsulating material into the space. It is favorable if the two holes are spaced maximally from each other, so that the encapsulating material reaches the air vent hole only if the space is already almost completely filled.

Although the adhering material can be provided in the form of a quickly curing glue, it is more convenient to provide it in the form of double sided adhesive tape which is positioned on either the flange of the reinforcement or the panel before the reinforcement and the panel are put together. Depending on the shape of the reinforcement flange the adhesive tape can be fully or partly pre-shaped in order to easily place it in the correct position. It should form a closed loop that is impermeable to the encapsulating fluid, so that it seals the slit between the reinforcement flange and the panel so as to prevent the encapsulating material from leaving the space before it is cured. The adhering material should be robust enough to withstand the external load during assembly of the parts and during the low pressure injection molding, while it should also be sufficiently flexible to absorb tolerances of the parts to be connected.

If the panel is provided with a peripheral seal arrangement which is fastened to the panel by encapsulation, this encapsulation can be done simultaneously with/or separate from the filling of the reinforcement with encapsulating material.

Another aspect of the invention provides a reinforced closure panel assembly for use in a vehicle roof assembly, which comprises:
  a substantially planar closure panel having two opposite surfaces,
  at least a reinforcement having a circumferential flange fitting on one of the surfaces of the panel with interposition of adhering material, thereby forming an enclosed space between the panel and the reinforcement within the circumferential flange sealed by the adhering material, solidified encapsulating material substantially completely filling said space to form adherence, and in one embodiment the main adherence, of the reinforcement to the panel.

In this structure it is favorable if the height of the space between the reinforcement and the panel is substantially less than the width thereof. A small height of the space reduces the head room loss and reduces the amount of encapsulating material to fill the space. This latter reduces the cost of the assembly as the encapsulating material is quite expensive. The height of the space does hardly contribute to the bonding force of the encapsulating material. A low height of the reinforcement might lead to a reduced longitudinal rigidity thereof but this can be compensated if the reinforcement has a portion laterally offset from the space that is more rigid along the length than the portion surrounding the space. For example this portion may form a bracket having members to fasten the panels to other parts. As such bracket will generally extend away from the panel, it creates longitudinal rigidity.

Further details and advantages of aspects of the invention follow from the description with reference to the drawings showing embodiments of the invention by way of example.

DETAILED DESCRIPTION

Figure 1:
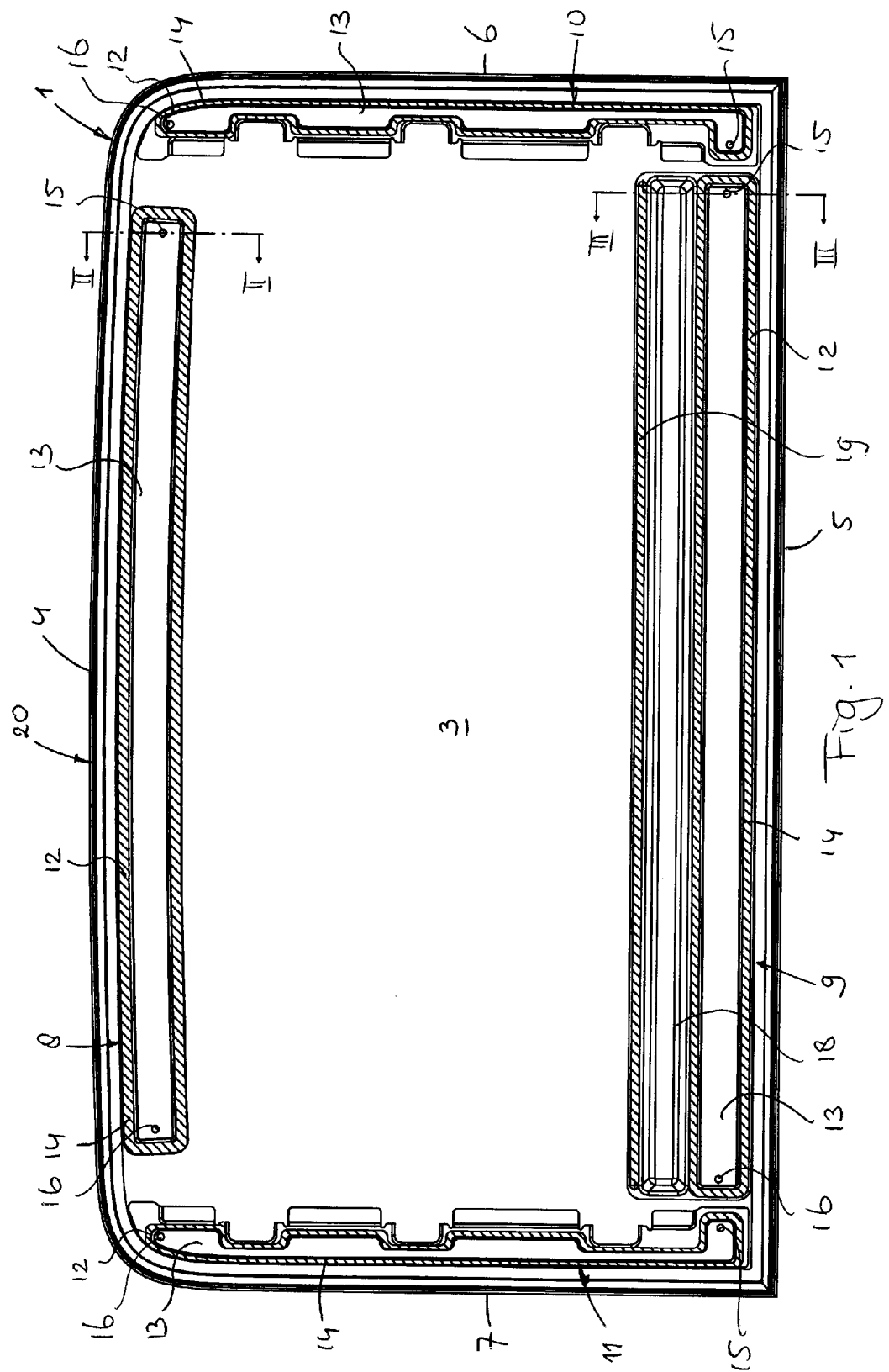
FIG. 1 is a bottom view of a first embodiment of a reinforced closure panel assembly for a vehicle roof assembly.
Figure 2:
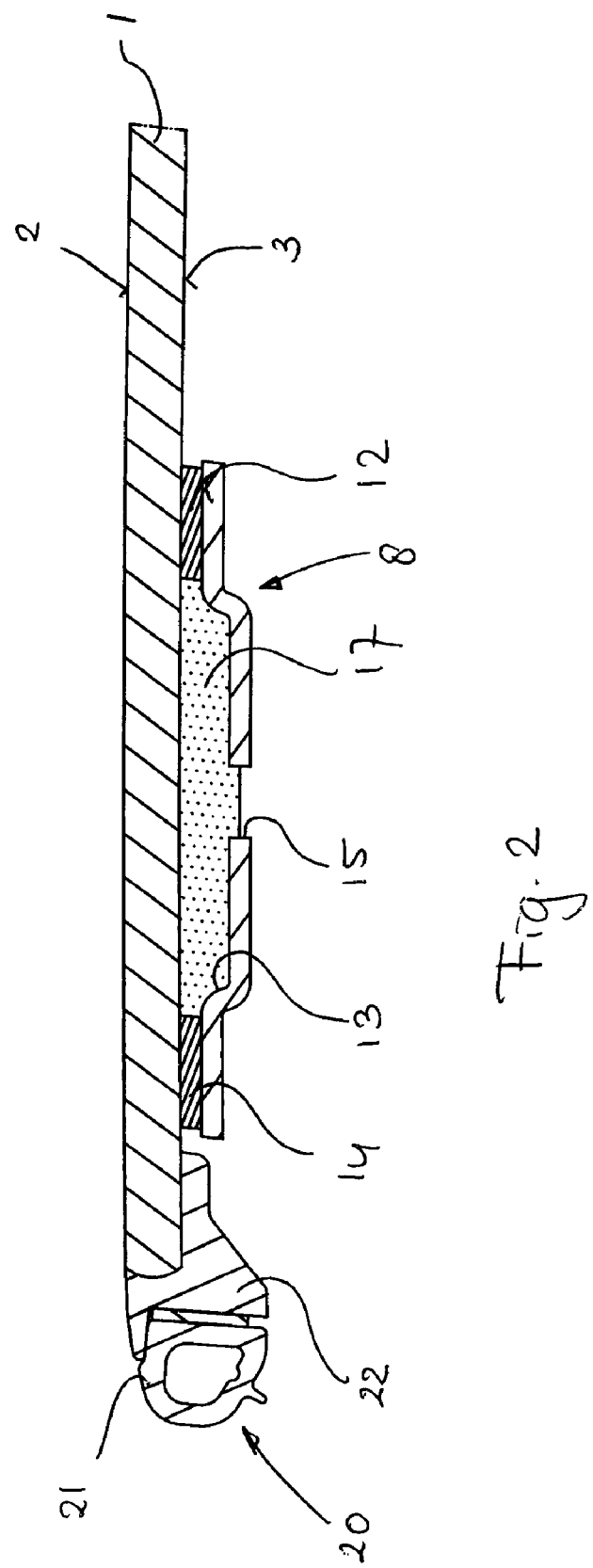
FIGS. 2 and 3 are enlarged cross sectional views along the lines II-II and III-III, respectively, in FIG. 1.
Figure 3:
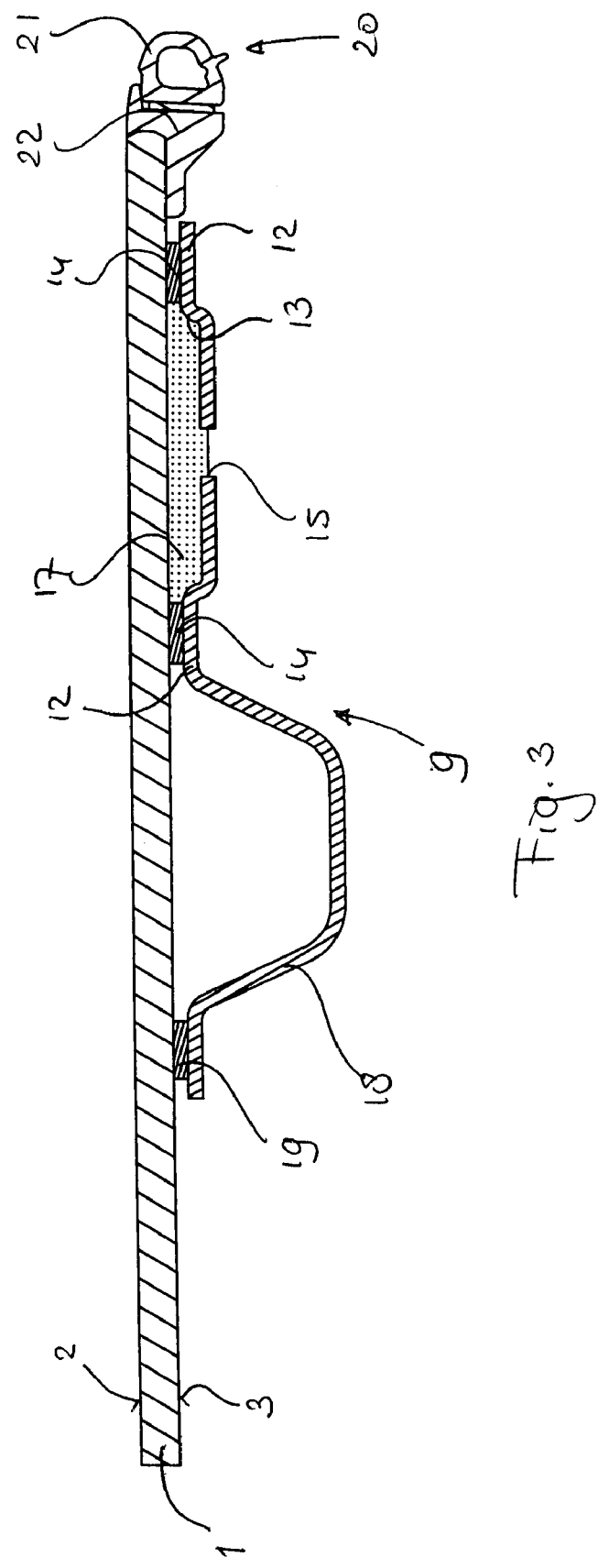

FIGS. 1-3 show a first embodiment of a reinforced closure panel assembly for a vehicle roof assembly. Such panel assembly is used to close an opening in a vehicle roof, in particular the roof of a passenger car. The panel may be stationary or may be movable in order to selectively open and close the roof opening. Such roof assemblies are known and not shown here.

The reinforced closure panel assembly includes a substantially planar panel 1 having an upper surface 2, a lower surface 3, a front side 4, a rear side 5, a left side 6 and a right side 7 so as to form a substantially rectangular panel. The panel may be slightly curved in longitudinal and/or cross section and the sides may be straight or slightly curved, while the corners between the sides 4-7 may be rounded or not.

The panel 1 will generally be made from glass or the like, but also other materials such as plastic, are conceivable. Panel 1 may be transparent, semi-transparent or non-transparent, and may even have adjustable light transmitting characteristics.

In order to improve the rigidity of the panel 1, in particularly against bending thereof, the panel 1 is provided with at least one reinforcement, in the case of FIG. 1, with four reinforcements, i.e. a front reinforcement 8, a rear reinforcement 9, a left reinforcement 10 and a right reinforcement 11.

Each reinforcement 8-11 is provided with a circumferential flange 12 (hatched in FIG. 1) so as to form a closed loop and having a planar shape fitting the local shape of the panel 1 at the position where the respective reinforcements 8-11 should be attached. When the respective reinforcement 8-11 is positioned on the lower surface 3 of the panel 1, the reinforcement 8-11 and the lower surface of the panel 1 enclose a space 13.

To ensure that the reinforcement 8-11 sealingly engage the lower surface 3 of the panel 1 so as to enable the space 13 to be filled with fluid material, there is provided an adhering material between the flange 12 of the reinforcement 8-11 and the panel 1, here in the form of an adhesive tape 14 which adheres on two sides so as to be able to adhere the flange 12 of the reinforcement 8-11 to the lower surface 3 of the panel 1 at least temporarily and to seal the space 13 at least when it is being filled with encapsulating material.

The adhesive tape 14 can be supplied on rolls, and may be tailored by production workers on site. If the flange 12 has a more complex shape ("footprint"), it is more convenient to shape the tape 14 so as to conform to the footprint, and also an intermediate solution is conceivable in which the tape is prepared, for example by having an incision such that the shape of the footprint is covered. The surfaces to be adhered by the tape or other adhering material are prepared to enhance the bonding, for example by cleaning or chemically treating the surfaces to promote adhesion as required by the adhering material used.

FIGS. 1-3 further show that each reinforcement 8-11 is provided with at least two (and here by way of example exactly two) holes 15, 16 which are arranged on opposite ends of each reinforcement 8-11 which are elongated in shape so that there is a maximum spacing between holes 15 and 16 in each reinforcement 8-11. One of the holes 15, 16 is used to inject encapsulating material 17, while the other hole is used to allow air in the space 13 to escape when the fluid material is injected, so as to allow the fluid material to completely fill the space 13.

The fluid bonding material that is used to fill the space 13 in order to securely bond the reinforcement 8-11 to the panel 1 may be the well known PU encapsulating material (e.g. a two component material that solidifies quickly under absence of air and humidity, as in contrast to PU glue which requires air and humidity to solidify), but also other fluid materials that solidify quickly may be used, such as PVC (polyvinyl chloride) encapsulating material. As a further material it is conceivable to use structural adhesive foam, which is a material that foams when it is injected and cures/solidifies. Any material that is used should adhere well to the material of the panel and of the reinforcement and it is favorable if the material also contributes to the rigidity of the reinforcement. The material of the reinforcement can, by way of example and not limitation, be a metal, such as steel or aluminium, but also rigid (fiber-reinforced) plastics are conceivable as well as combinations thereof.

The front reinforcement 8 as shown in the cross section in FIG. 2 has a low profile, so that the height of space 13 is considerably less than the width thereof. In one embodiment, "considerably less" means in this respect less than substantially half of the general width of the space 13, which of course may vary along the length of the reinforcement 8-11.

A lower height of the reinforcement 8 generally leads to a lower rigidity. FIG. 3 shows a manner to increase the rigidity, in this case used to increase the rigidity of the rear reinforcement 9. As is shown, the reinforcement 9 includes a portion surrounding the space 13 and a further portion 18 being laterally off set from the space 13 and being positioned outside of the circumference defined by the flange 12. This portion 18 has a height greater than that of the space 13 and therefore provides an increased rigidity along the length of the reinforcement 9. This way of increasing the rigidity is particularly useful if head room loss is not very important there. There is provided a further adhesive tape 19 to attach this portion 18 of the reinforcement 9 at a position spaced from the adhesive tape 14, but this adhesive tape 19 does not have to seal the space between the lower surface 3 of the panel 1 and the portion 18 of the reinforcement 9. It is just provided to form a further connection between the reinforcement 9 and the panel 1.

FIGS. 2 and 3 show that at the outer circumference of the panel 1 there is provided a peripheral seal arrangement 20 including in this case a bulb seal 21 attached to the panel 1 through encapsulating material 22. The encapsulation of the peripheral seal surface can take place simultaneously with filling the space 13 with encapsulating material 17 or can be done in a separate process step.

Figure 4:
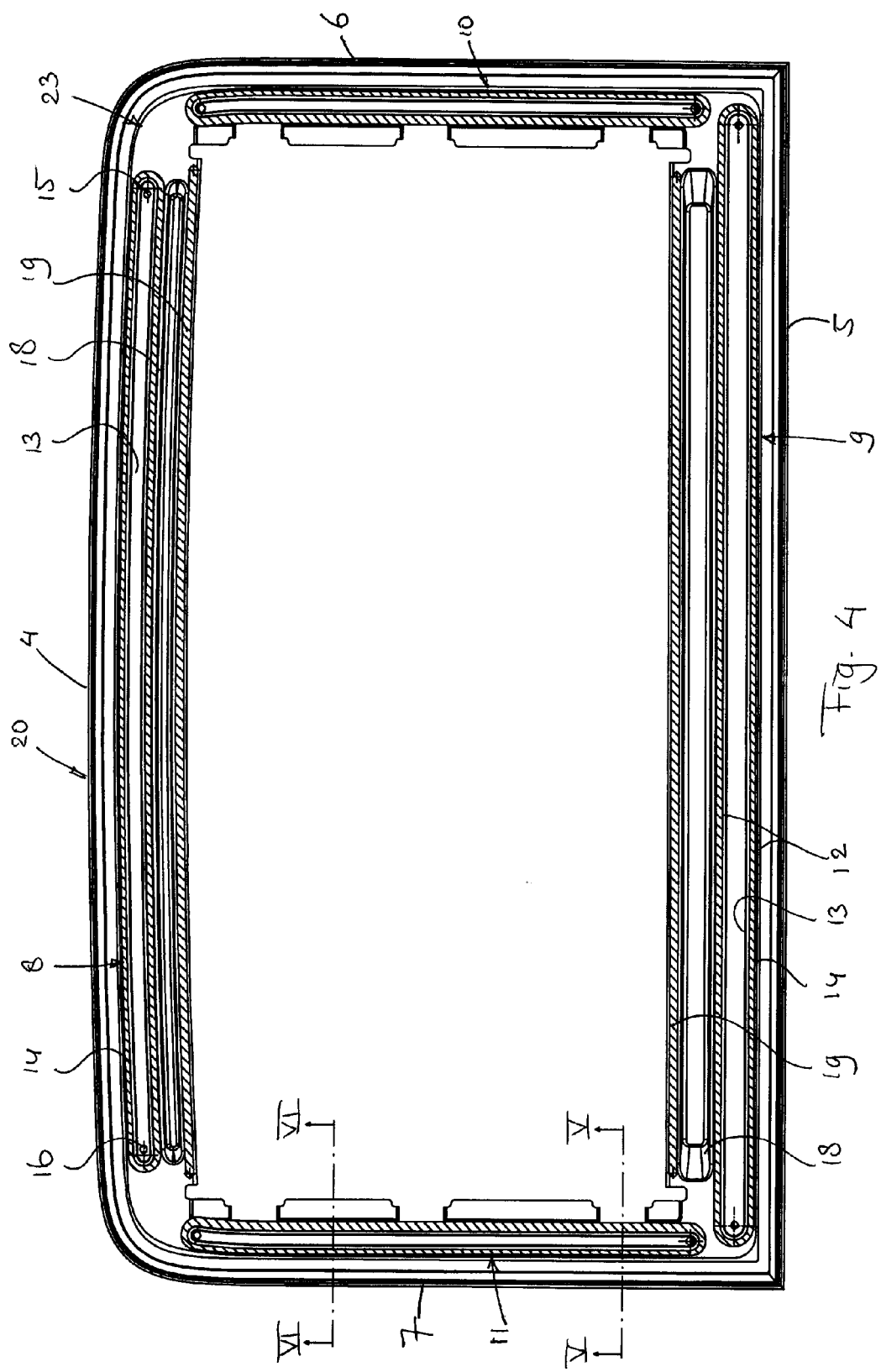
FIG. 4 is a view corresponding to that of FIG. 1, but showing a second embodiment of the reinforced closure panel assembly according to the invention.

FIG. 4 shows a further embodiment of a panel assembly, wherein reinforcements 8-11 are united into a reinforcement arrangement that extends along the four sides 4-7 of the panel 1 and forms a one piece unit. However, also in this arrangement, the reinforcements 8-11 extend only along one side of the panel 1 and therefore also the space 13 in these reinforcements 8-11 only extends along one side of the panel 1. The reinforcements 8-11 of this second embodiment are shaped somewhat different from those of the FIG. 1 embodiment, but have the same principle. The front reinforcement 8 is now constructed similarly to the rear reinforcement 9.

Figure 5:
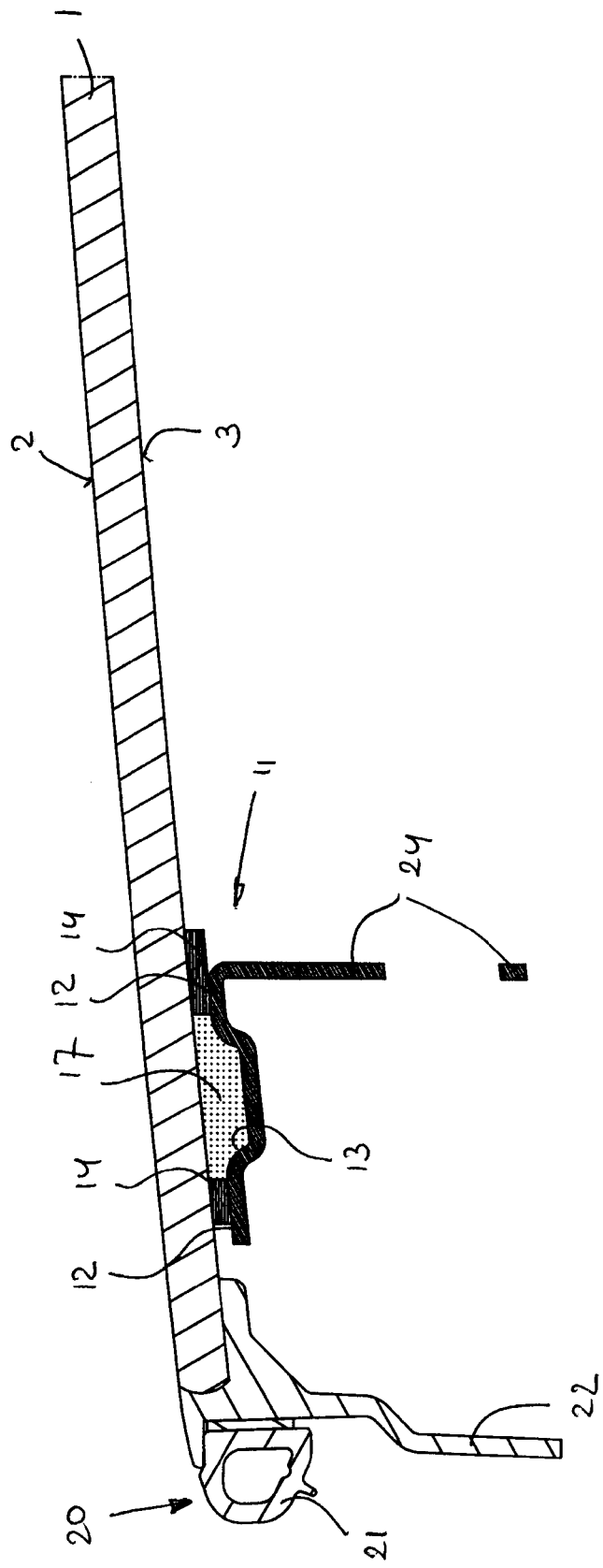
FIGS. 5 and 6 are enlarged cross sectional views along the lines V-V and VI-VI, respectively, in FIG. 4.
Figure 6:
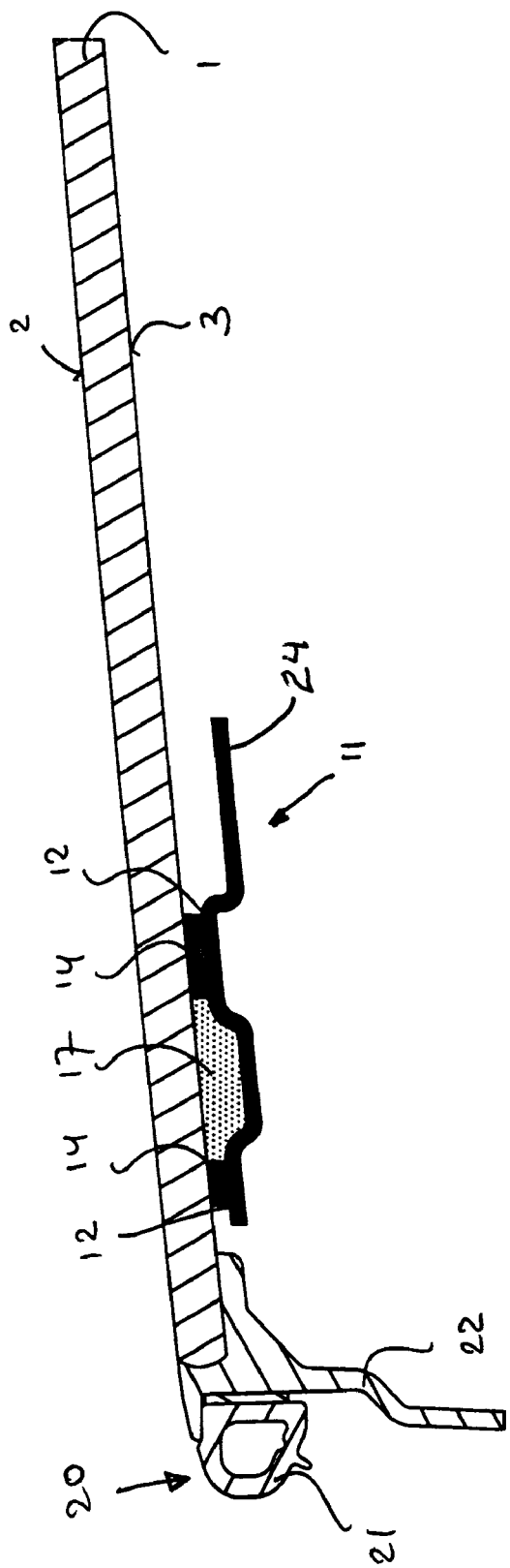

FIGS. 5 and 6 are two cross sections of the right reinforcement 11 and it is shown that the reinforcement 11 (and also the other reinforcement 10) is provided with a bracket portion 24 which is laterally offset from the space 13 and this bracket portion 24 is used to connect the panel assembly to another part such as a frame of the roof assembly or an operating mechanism that is used to move the panel assembly between different positions. In the cross section according to FIG. 5, this bracket portion 24 extends downwardly, while in FIG. 6 it extends substantially parallel to the panel 1 and this bracket portion 24 increases the rigidity of the respective reinforcement 10, 11.

It follows from the above that aspects of the invention provide a panel assembly manufacturing process that is efficient and cost effective. No waiting times and conditioned storing rooms are required. Finishing of the encapsulating material is not required and the encapsulating equipment can be kept simple. Using encapsulating material leads to a higher rigidity than with glue.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

I claim:

1. A reinforced closure panel assembly for use in a vehicle roof assembly, comprising:
    a substantially planar closure panel having an upper surface and a lower surface,
    a reinforcement having a circumferential flange fitting on the lower surface of the panel with interposition of adhering material, thereby forming an enclosed space completely sealed by the adhering material between the panel and the reinforcement around the circumferential flange,
    solidified encapsulating material substantially completely filling said space to form adherence of the reinforcement to the panel, the encapsulating material being of a fluidic type prior to solidification wherein the adhering material prevents the encapsulating material from leaving the enclosed space before solidifying.

2. The panel assembly according to claim 1, wherein the adhering material is formed by two sided adhesive tape forming a closed loop.

3. The panel assembly according to claim 1, wherein the height of the space between the reinforcement and the panel is substantially less than the width thereof.

4. The panel assembly according to claim 1, wherein said space is elongated having two ends, and at least two holes being provided in the reinforcement entering the space near the respective ends.

5. The panel assembly according to claim 1, wherein the reinforcement has an adjacent portion laterally offset from said space that is more rigid along a length thereof than a portion of the reinforcement surrounding the space.

6. The panel assembly according to claim 1, wherein the reinforcement includes a bracket being laterally offset from and extending away from a portion of the reinforcement surrounding the space, the bracket having a free edge spaced apart from the lower surface.

7. The panel assembly according to claim 1, wherein the closure panel is rectangular having four sides, wherein the reinforcement extends along a length of one of the sides.

8. The panel assembly according to claim 1, wherein the closure panel is rectangular having four sides, wherein the reinforcement extends along at least two sides, and wherein the space of the reinforcement extends along a first side, and wherein the reinforcement includes a second circumferential flange fitting on the lower surface of the panel with interposition of adhering material, thereby forming a second enclosed space completely sealed by the adhering material between the panel and the reinforcement around the second circumferential flange sealed by the adhering material, wherein the second enclosed space extends along a length of a second side of the closure panel, and wherein the solidified encapsulating material substantially completely fills each of said space to form adherence of the reinforcement to the panel, the encapsulating material being of a fluidic type prior to solidification wherein the adhering material prevents the encapsulating material from leaving the enclosed space before solidifying.

9. The panel assembly of claim 1 wherein the adhering material forms a closed loop to form a seal with the reinforcement and the panel around the space.

10. The panel assembly according to claim 5, wherein the adjacent portion is a bracket having a free edge spaced apart from the lower surface.

* * * * *